United States Patent [19] [11] 3,848,264
Wilson [45] Nov. 12, 1974

[54] MAGNETIC TAPE CARTRIDGE CHANGER

[76] Inventor: Charles T. Wilson, 121 N. Fountain, Wichita, Kans. 67208

[22] Filed: June 8, 1973

[21] Appl. No.: 368,303

[52] U.S. Cl. .................. 360/92, 360/105
[51] Int. Cl. .................. G11b 21/12, G11b 23/08
[58] Field of Search .................. 360/92, 105, 137

[56] References Cited

UNITED STATES PATENTS

| | | | |
|---|---|---|---|
| 3,431,367 | 3/1969 | Nickl | 360/105 |
| 3,511,940 | 5/1970 | Lemelson | 360/92 |
| 3,672,683 | 6/1972 | Ban | 360/92 |
| 3,699,266 | 10/1972 | Lemelson | 360/92 |
| 3,733,078 | 5/1973 | Staar | 360/92 |
| 3,756,609 | 9/1973 | Sato | 360/92 |

*Primary Examiner*—Stanley M. Urynowicz, Jr.
*Attorney, Agent, or Firm*—Malin & Haley

[57] ABSTRACT

An improved 8-track stereo tape cartridge changer in which the cartridge changing mechanism and tape playout amplification system are housed in a compact storage box which is mountable in the trunk of a vehicle, with the tape selection and amplifier control panel separately positioned within the vehicle in an area accessible to the driver or passengers. The invention includes an improved cartridge selection and changing mechanism in which the tape transducer is horizontally and vertically movable by solenoids and an endless chain respectively to achieve a selectable change of cartridge with a minimum of parts without sacrificing system reliability and operational integrity. The selector mechanism provides for manual selector actuated cartridge selection but is adaptable to provide automatic sequencing. The invention is characterized by reduced complexity, compactness, and increased reliability and efficiency of operation.

10 Claims, 15 Drawing Figures

MAGNETIC TAPE CARTRIDGE CHANGER

BACKGROUND OF THE INVENTION

This invention relates generally to multiple stereo tape cartridge changers, and in particular to a tape cartridge changer having a fixed cartridge rack which houses a plurality of tape cartridges disposed vertically and a movable magnetic tape transducer which is positioned and aligned to a selected cartridge horizontally utilizing an endless chain, the transducer being disengaged vertically from the cartridge during cartridge change.

In recent years the tape cassette or cartridge audio playback system has found increased usage in vehicles, but due to the high theft rates, increased size of the units, and increased costs, many people who are desirous of playing tape cartridges and installing the entire system in a vehicle have not done so. Applicant's invention provides a compact multiple tape cartridge selector and playout device which allows the cartridge changer and amplifier system to be temporarily or permanently stored in the trunk of the vehicle, reducing theft possibility. The device may also be utilized in a home or business environment in which it is desirous of hiding the tape storage box, the drive unit and the amplification system from view. The invention can be employed with video or information retrieval systems utilizing a plurality of magnetic tape cartridges. Most importantly, however, Applicant's invention provides a novel cartridge changer having a reduced number of moving parts while increasing system reliability.

BRIEF DESCRIPTION OF THE INVENTION

An improved magnetic tape cartridge changer comprising a lower rectangular supporting frame, an upper rectangular supporting frame, a plurality of vertical supporting bars, one mounted at each frame corner connecting rigidly said upper supporting frame to said lower supporting frame, each of said vertical supporting members having a longitudinally grooved face, paired inwardly in the plane of each end of said rectangular frames, a multiple cartridge rack connected and disposed within said upper supporting frame, a plurality of cartridges vertically disposed and coupled within said cartridge rack, transducer and drive support means, a magnetic transducer and drive means mounted on said transducer and drive support, said transducer and drive support means including a rectangular support frame slideably mounted to said vertical support members disposed at each end within the grooves in said vertical support member, said transducer and drive support means having a pair of horizontal support arms having grooved portions therein and a transducer and drive support plate coupled slideably within the grooved portions of said horizontal support arms, an endless chain driveably connected to said transducer and drive support plate, a pair of sprockets rotatably mounted at opposite ends of said lower support frame, sprocket driving means connectable to one of said sprockets, a pair of solenoids connected to said lower rectangular frame support, said solenoid armatures connected to said transducer and drive support frame, a plurality of stationary electrical contacts disposed longitudinally along said transducer and drive plate support frame, each contact aligned vertically to correspond with the location of a particular cartridge, a movable contact connected to said transducer and drive support plate, and a selecting circuit means connected to said stationary contacts and said moving contact, said sprocket drive means, and said solenoids, for positioning said transducer horizontally and vertically in engagement with a particular selected tape cartridge.

When the transducer and tape drive is in contact and engaging a particular cartridge, the sprocket driving means and solenoids are in an "off" condition. A double stacked selector switch is utilized having a plurality of different possible selecting points which individually correspond to a particular tape cartridge. In one embodiment, the system utilizes twelve tape cartridges necessitating twelve positions upon the double stacked selector switch, each position being equated to a particular tape cartridge. The first stage of the selector switch is connected electrically to a pair of firing circuits with half of the switch contacts connected to one of the firing circuits, the remaining half connected to the other firing circuit, the connections being alternate from adjacent selector contact positions. Both firing circuits are coupled to a double pole, double throw relay inductor. Movement of the selector switch to any other position causes a momentary current surge once the selector switch engages the next position which provides a trigger pulse through the firing circuit in that particular line driving the inductance which closes the double pole, double throw relay completing the circuit to a sprocket drive motor and the solenoids causing them to operate. The transducer plate including the moving contact is driven horizontally until the transducer is aligned with the cartridge and the stationary contact (determined by selector switch position) completing the circuit shorting out the inductance on the double pole relay to ground, opening the relay, turning off the sprocket motor and the solenoids. A mechanical spring or springs then return the transducer plate frame vertically into operable position with the cartridge. Whenever the tape is finished playing or at any time desired, another tape can be selected in a similar manner.

It is an object of this invention to provide an improved 8-track stereo tape cartridge changer.

It is another object of this invention to provide a stereo tape cartridge changer of reduced complexity and improved reliability.

And yet still another object of this invention is to provide a tape cartridge changer having a plurality of cartridges mounted to a receiving frame with a horizontally and vertically moving tape head engageable to a preselected cartridge.

And still yet another object of this invention is to provide a tape cartridge changer having an improved selector switching mechanism.

But still yet another object of this invention is to provide a multiple tape cartridge storage device for use in audio, video, or digital magnetic storage information which allows preselectability of a particular cartridge in the playout thereof.

Yet still another object of this invention is to provide a multiple tape cartridge system having a compact changer mechanism and amplification system which is separable from the selector panel to provide for installation within vehicles or for home or business environments.

In accordance with these and other objects which will be apparent hereinafter, the instant invention will now be described with particular reference to the accompanying drawings.

PREFERRED EMBODIMENT OF THE INVENTION

Figure 1:
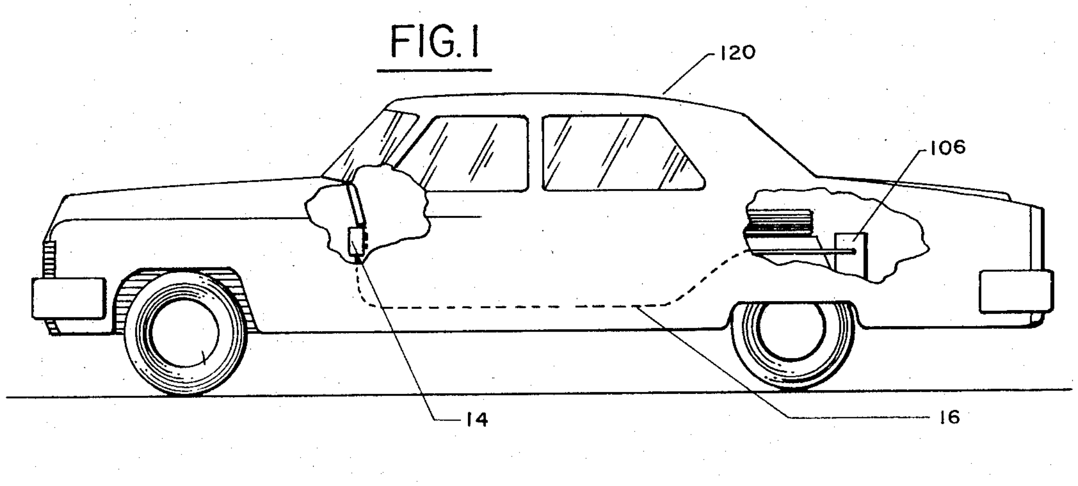
FIG. 1 shows applicant's invention disposed within an automobile.

Referring now to the drawings and in particular FIG. 1, Applicant's invention is shown as it would be disposed in a vehicle 120 trunk comprising a storage housing 106 having a lead-out cable 16 (dotted) connected to the selector box 14 mounted on the dashboard.

Figure 2:
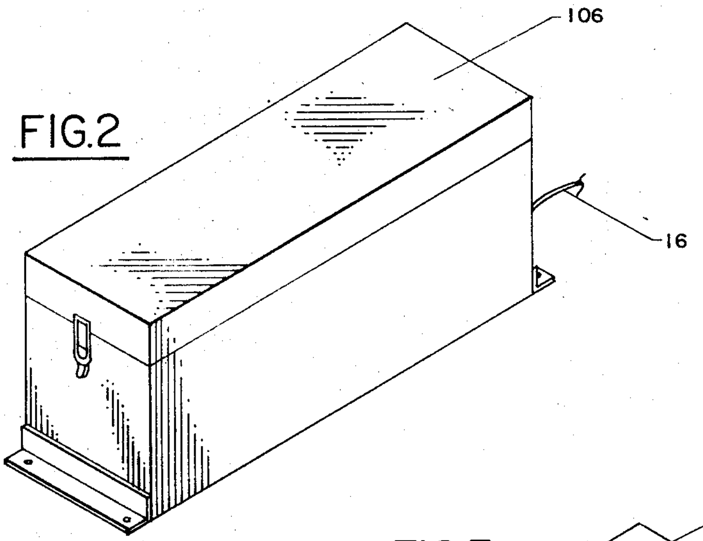
FIG. 2 shows the storage housing of applicant's invention in perspective.
Figure 3:
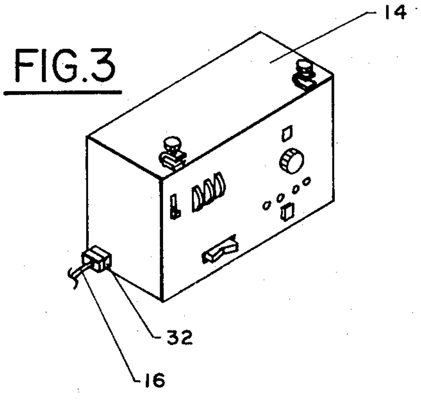
FIG. 3 shows a perspective view of the selector console utilized with applicant's invention.

FIG. 2 shows the storage housing 106 utilized for housing the cartridge changer and the amplification section of the tape including the transducer power source with a lead-out cable 16 connected into a selector box 14, FIG. 3, through jack 32.

Figure 4:
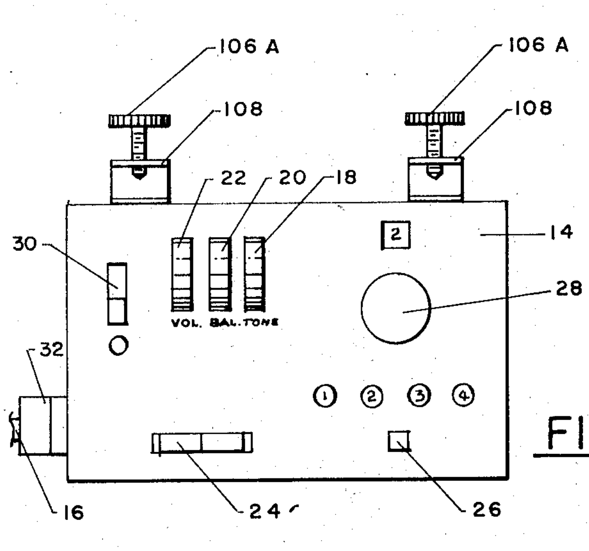
FIG. 4 shows a front elevational view of a selector mechanism utilized with applicant's invention.

FIG. 4 shows the selector box 14 face which is conventional having selectable features for tape channel selection 26, a tape cartridge selector 28, on-off switch 30 and a repeat sequencing switch 24. The entire selecting housing 14 may be mounted on a dashboard by a pair of flanges 108 coupled to the dash by threaded screws 106A.

Figure 5:
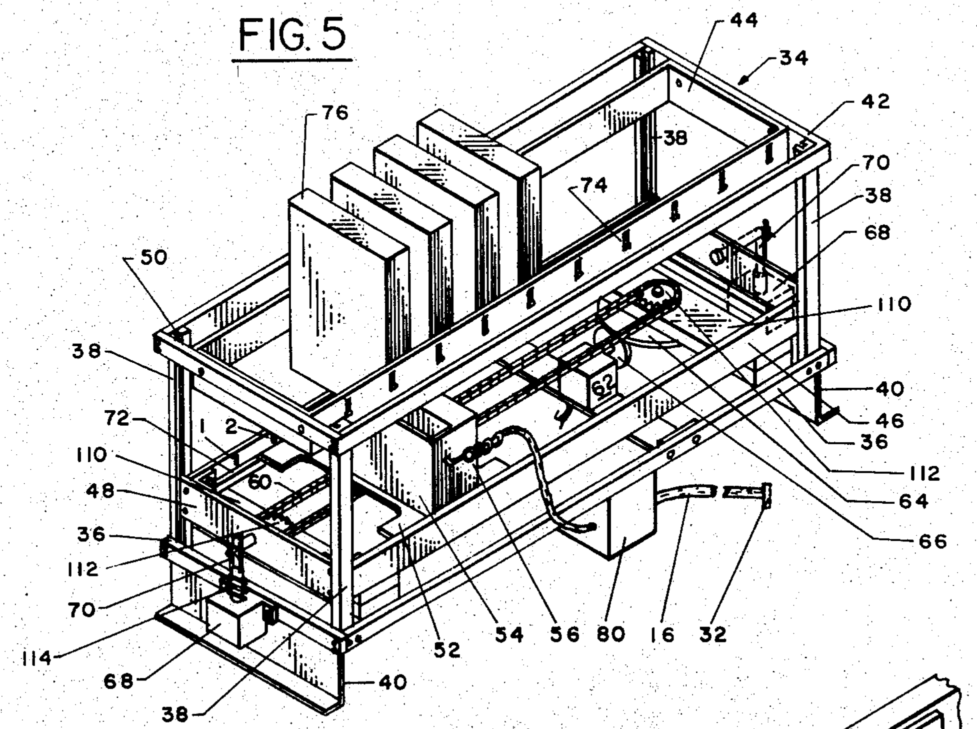
FIG. 5 shows applicant's invention removed from the storage box in perspective.

FIG. 5 shows the tape cartridge changing mechanism 34 and tape transducer amplifier system in a unit removed from the storage box 106, shown previously. The unit is comprised of a pair of L-shaped support legs 40 rigidly coupled to a lower rectangular supporting frame 36 having four rectangular support arms 38 rigidly coupled thereto at each corner of the lower frame 36. Each of the vertical support arms 38 has a grooved portion 50 facing each other in pairs in a planar end direction at both ends of changer mechanism 34. The tops of the frame members 38 are rigidly coupled to an upper rectangular frame 42, the lower and upper frame members and vertical members 38 forming a rectangular box. Rigidly coupled within the upper frame 42 is a cartridge rack 44 containing a plurality of cartridges 76 vertically disposed which are resiliently held in position substantially parallel and equally spaced by holding clips 74 which resiliently hold the cartridges in position. The tape transducer and tape drive unit (which is conventional) is mounted in a transducer box 54 which is rigidly coupled to the support plate 52. The transducer support plate frame 46 is slideably mounted so that each end bar 48 of the frame is received into grooves 50 in the vertical support arms 38. This allows the entire frame 46, support plate 52 and transducer box 54 to vertically slide up and down within the grooves 50. The transducer support plate frame 46 further includes a pair of lateral support arms 110 coupled between the longitudinal arms of frame 46 at each end including a pair of sprockets 112 rotatably mounted thereon. Chain 60 is endlessly coupled between both sprockets 112. Each longitudinal arm of support frame 46 has a grooved portion 72 longitudinally disposed thereof which receives the plate 52 at each end allowing the entire transducer box 54 and support plate 52 to slide horizontally within the frame 46. The support plate 52 is driven reciprocally by chain 60, as described below. A solenoid 68 is coupled at each end of frame 36. Each solenoid armature is connected to one end of the support arm 48 and provides vertical, downward movement of the support frame 46 when the solenoid is actuated.

A flexible coiled wire 56 electrically connects the transducer to amplifier 80. The cord 56 is of sufficient length to allow it to travel to each end of the entire frame network. The transducer and tape drive means within box 54 including track selection are conventional and are well known in the art.

Figure 6:
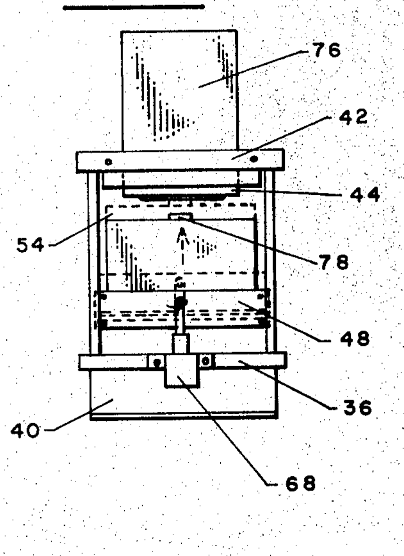
FIG. 6 shows an end planar view of applicant's invention.

FIG. 6 shows a side view with the tape engaging transducer 78 disposed slightly below the outline of the tape head support box 54. When the solenoid power is shut off, the return spring 114 (FIG. 5) on each solenoid will force the transducer support box 54 with the entire frame 46 back to its initial position which is in contact with the tape cartridge 76 to allow recording or playback of the tape.

Figure 7:
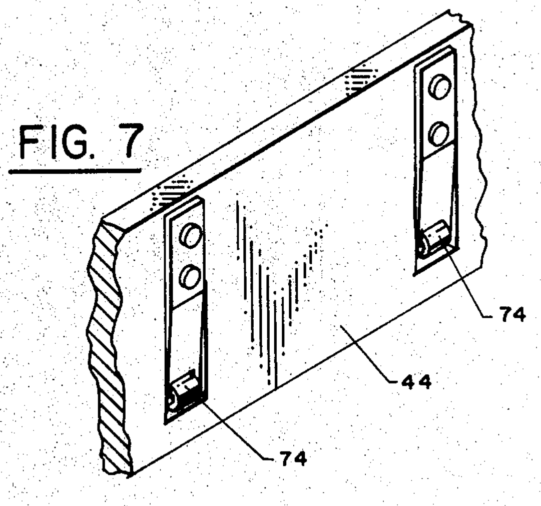
FIG. 7 shows a partial view of the cartridge holding means.

FIG. 7 shows a resiliently mounted cartridge holding roller 74 which is attached to the cartridge support frame 44 at each position where a tape cartridge is to be firmly held in position.

Figure 8:
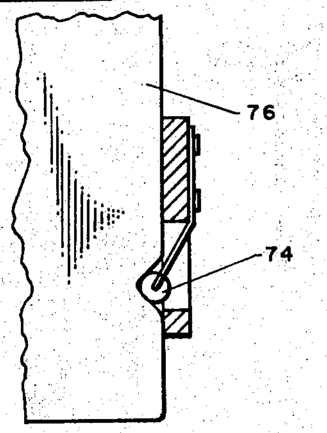
FIG. 8 shows in partial cross-section, a view of the cartridge holding mechanism.

FIG. 8 shows the roller 74 received into a notch in the cartridge box 76 which holds the cartridge in position and allows it to be removed if a different cartridge is to be positioned into that slot.

Figures 9, 10:
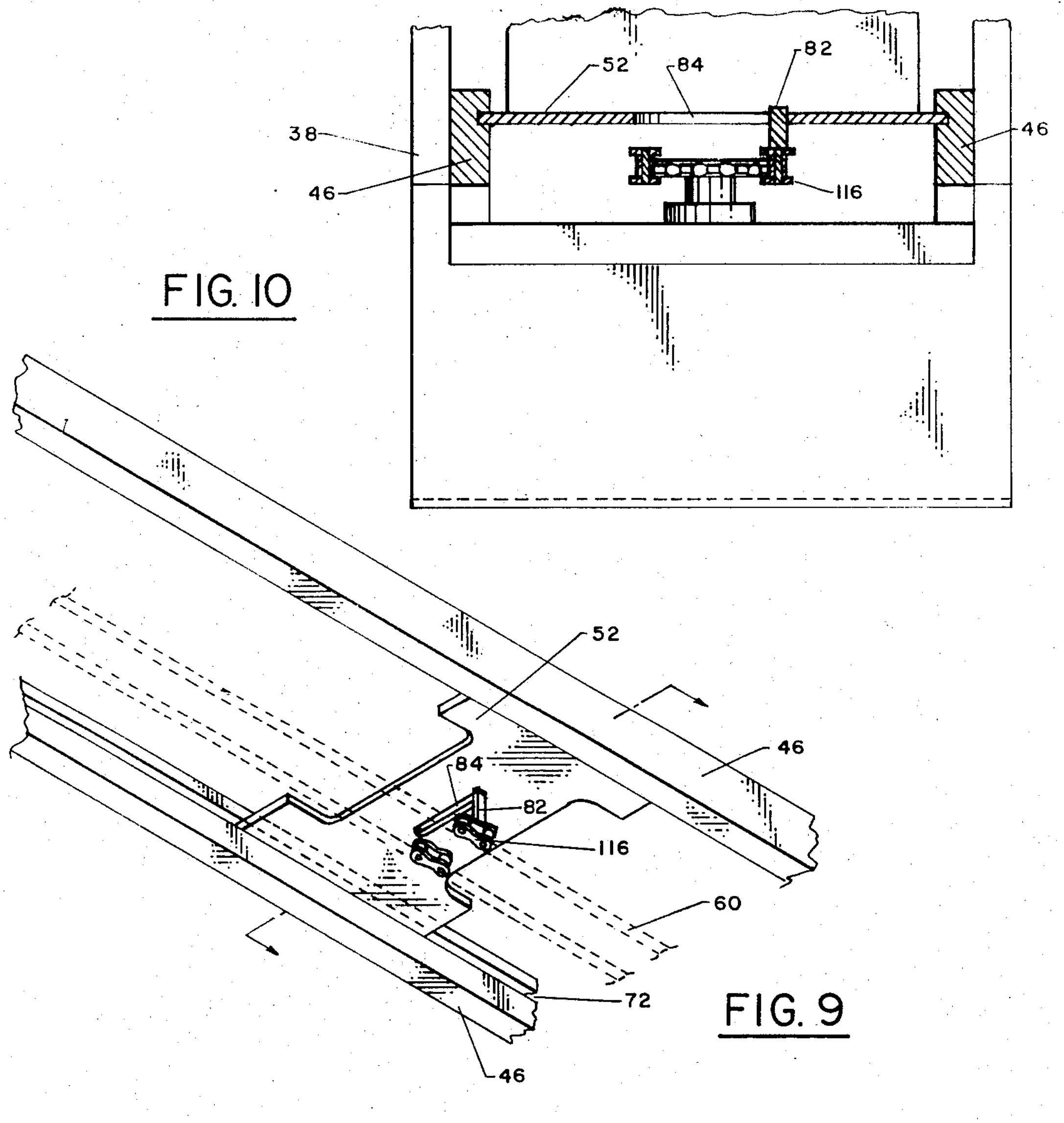
FIG. 9 shows a perspective view of the underside of the transducer support plate and drive mechanism which is coupled to the chain shown in phantom.
FIG. 10 shows a partial cross-sectional view of the transducer support plate moving mechanism utilized in applicant's invention.

FIG. 9 shows the coupling of the chain to the plate 52 comprising two chain links 116, (the remaining of the chain 60 shown in phantom) one of the links having a pin 82 rigidly coupled to its upper side protruding through lateral slot 84 disposed in the head support plate 52. Movement of the chain link 116 causes movement of the support plate 52 longitudinally of the frame 46 axis. The slot 84 allows movement in both directions as the link is rotated around the sprocket at each end and changes direction. The plate 52 mounted in frame groove 72 slides along the horizontal longitudinal direction.

FIG. 10 shows the pin 82 rigidly coupled to chain link 116 emerging through the slot 84 in support plate 52.

Figure 11:
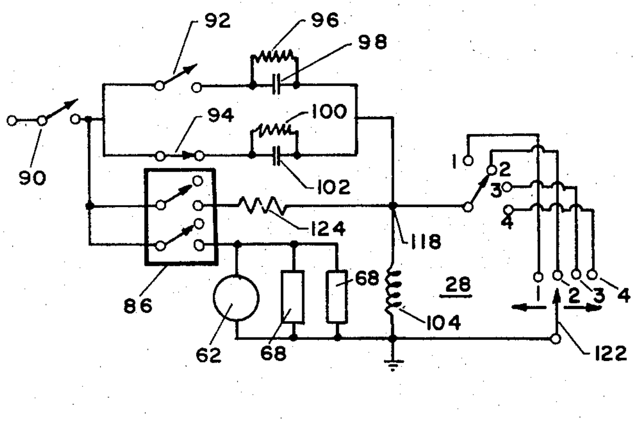
FIG. 11 shows a schematic circuit diagram of the selector circuits utilized in applicant's invention.

FIG. 11 shows the circuit diagram for the selection and actuation of a particular cartridge. Switch 90 is a master power switch for turning on the entire system. Switches 92 and 94 represent adjacent selector position switches on the first stage, double stacked selector switch 28 showing that when one is open the other then will be closed causing a current surge in capacitor 102 and current flow in inductance 104 which is coupled through a double pole, double throw relay 86 closing the relay switches, providing a holding circuit for power to motor 62 and solenoids 68. Once the relay 86 is closed, current will be provided to the motor 62 and the inductance 104 and the solenoids 68 continuously until the current through the inductance 104 is shorted to ground through the second stage double stacked slector switch 28 and the contacting of the moving brush 122 (shown by the arrows) to the particular closed switch position on the selector switch. As soon as the brush contacts this selected circuit, the inductance is shorted to ground, thus opening double pole, double relay 86 dropping the motor, solenoids and inductance off the line.

Figures 12, 13, 14:
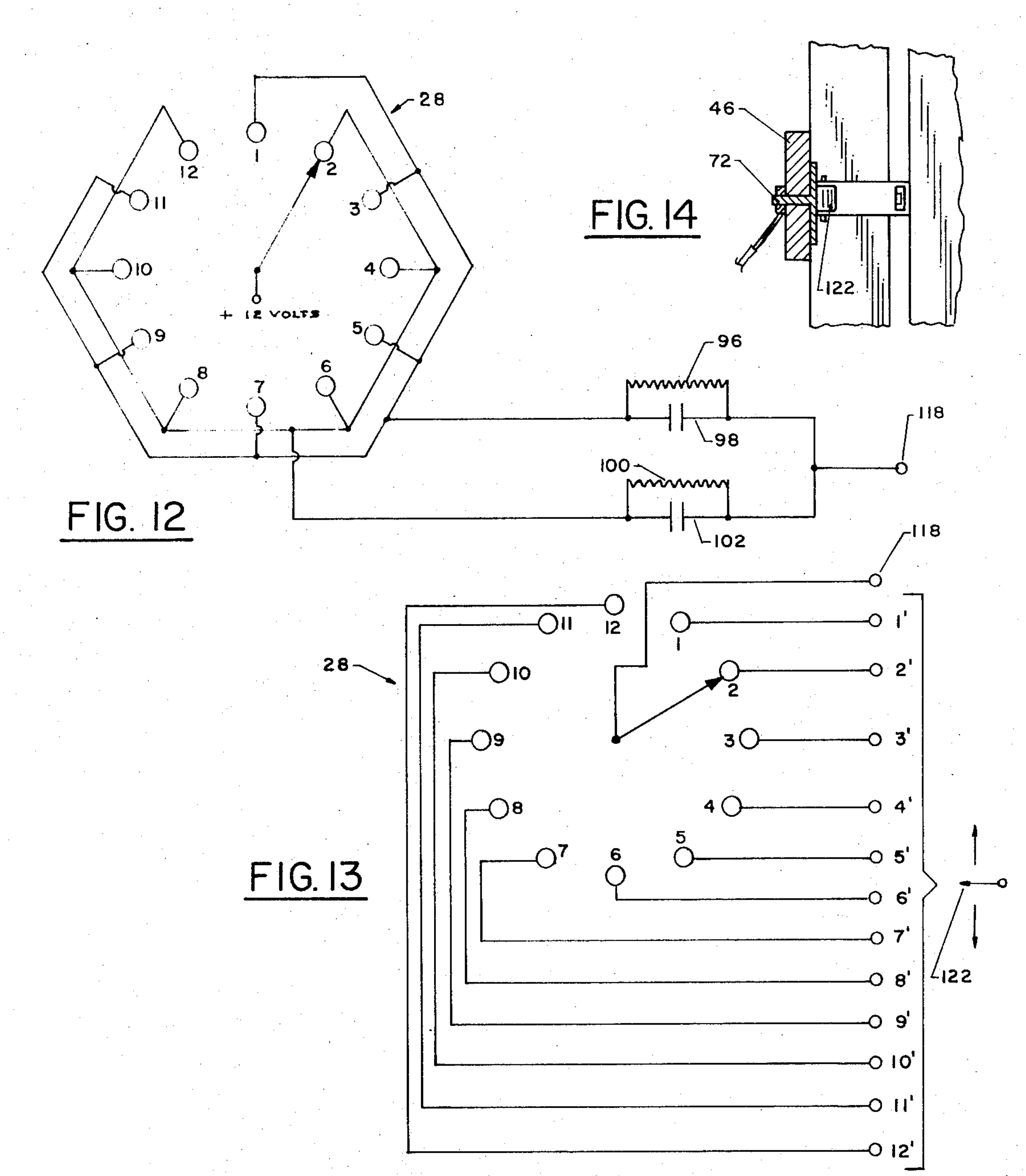
FIG. 12 shows a circuit diagram of the first stage stacked selector switch and the associated firing elements.
FIG. 13 shows a circuit diagram for the second stage stacked selector switch including stationary and movable contact points.
FIG. 14 shows an elevational view partially in cross-section of the movable and stationary electrical contacts in engagement in applicant's invention.

FIG. 12 shows a twelve pole, twelve position selector switch 28 which is the first stage stacked selector switch which fires and provides a triggering pulse to drive the closing relay. It can be seen by selector position contacts one through twelve, alternate contacts are connected in parallel which may be designated as even or odd contact group, (represented by switches 92 and 94, FIG. 11) each of the groups being connected to different capacitors 98 or 102. Resistors 96 and 100 provide for a current drain off after the triggering pulse has been fired. Thus, regardless of the final selector position desired, movement from the present position to either adjacent contact will provide a triggering pulse to begin the movement and change of cartridge.

FIG. 13 shows the second stage of the double stacked selector switch 28 which is moved integrally with the first stage selector switch and will synchronously align the first and second stage selector contacts. A circuit here includes an extra contact which leads to junction point 118 (shown in FIG. 11). The contacts numerically primed from 1 to 12 represent the linearly arranged stationary contact points which are adjacent the movable transducer box support structure and are physically coupled to the supporting frame 46 (FIG. 5) along the inside of the longitudinal arm disposed in a sequence which aligns each stationary contact vertically with a different particular cartridge disposed in the cartridge rack. The surface length of the contact is determined by the amount of system momentum presented by the movement of transducer support box 54, therefore always aligning the system with a higher tolerance of accuracy.

FIG. 14 shows a stationary contact 72 mounted on an insulated longitudinal arm of frame 46 engaging a moving brush contact 122 which is connected to the system ground.

The transducer head and track selector located in the support box 54 is electrically connected to an amplifier 80 (FIG. 5) by a flexible wire 56. The amplifier is then connected by a cable to a jack plug 32 which is engageable into the control panel at a remote location.

The transducer box 54 is driven longitudinally along the frame 46 whenever the frame is pulled vertically downward through the solenoid action such that circular disc 64 is engaged to motor drive wheel 66. The disc 64 is connected to sprocket 112 such that when the disc 64 is rotated the sprocket and hence chain 60 will be driven. Engagement of disc 64 and motor disc 66 is only possible when the frame 46 is in its downward lowest position.

Figure 15:
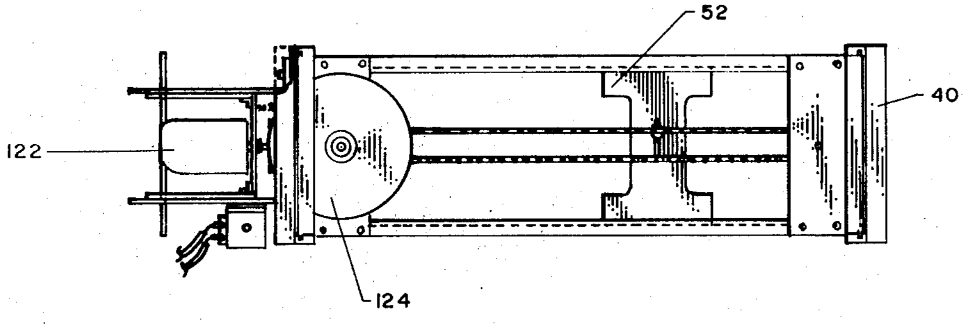
FIG. 15 shows a bottom plan view of an alternate embodiment of applicant's cartridge changing mechanism.

FIG. 15 shows an alternate embodiment of applicant's invention in which the motor 122 is placed outside the frame and drives disc 122 in a similar manner whenever the frame is lowered such that the disc 124 can engage a disc coupled to motor 122.

The system is designed to operate on a standard twelve Volt DC electrical supply as found in the conventional automobile electrical system; however, the unit may be adapted to standard household current or other desirable operating environment. When utilizing a twelve volt system, the limiting resistor 124 (FIG. 11) should be 48 ohms with capacitors 98 and 102 at approximately 500 micro-farads with resistors 96 and 100 being substantially 20K ohms.

The moving contact 106 (FIG. 14) although shown as a roller may be any standard brush type contact that is movable and engageable with a plurality of spaced apart contacts.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. An improved magnetic tape cartridge changer comprising:

a supporting frame;

a means coupled to said frame for mounting a plurality of tape cartridges substantially parallel and spaced apart along a linear axis;

a plurality of tape cartridges positioned within said tape cartridge mounting means;

a tape transducer and tape drive means;

a carriage frame vertically movably mounted to said supporting frame, said transducer and tape drive means horizontally movably mounted to said carriage;

means coupled to said supporting frame for moving said transducer and tape drive means horizontally within said carriage, whenever said carriage is in a predetermined position;

resilient means for holding said carriage and said transducer and tape drive means into operable engagement with one of said plurality of tape cartridges;

drive means for moving said carriage and said transducer and tape drive means vertically out of engagement with one of said plurality of tape cartridges;

power source;

a plurality of contacts spaced apart and connected to said carriage frame, each of said contacts being aligned with a different one of said plurality of tape cartridges and disposed linearly in a direction of movement horizontally of said transducer and tape drive means;

a movable contact connected to and movable with said transducer and tape drive means and engageable with said plurality of carriage frame contacts;

multiple position selector switch; and a selector circuit means connected to said selector switch, said carriage drive means, said horizontal moving means for transducer and tape drive means, said power source, said plurality of frame contacts, said movable contact, whereby the predetermined tape cartridge may be engaged operably with said transducer utilizing predetermined positions within the selector switch which are identifiable with corresponding predetermined tape cartridges.

2. An improved tape cartridge changer, as in claim 1, wherein, said selector circuit means includes:

a pair of trigger pulse means, each connected to a different alternate group of selector switch contact positions;

holding circuit means connected to and actuated by said trigger circuit means;

a relay switch coupled to and actuated by said holding circuit means connecting said carriage drive means and horizontal transducer drive means and horizontal transducer drive means to said power source; and relay release circuit means connecting said stationary contacts, said moving contact, and said selector position contacts for deactuating said relay whenever said moving contact engages a particular preselected stationary contact.

3. An improved cartridge changing device, as in claim 2, wherein: said carriage drive means includes at least one solenoid connected to said frame and having a movable armature connected to said carriage, and said resilient means for holding said carriage includes a spring.

4. An improved cartridge changer, as in claim 3, wherein:

said supporting frame includes plurality of vertically disposed legs, a rectangular upper cross-frame connecting upper ends of said vertical legs, a lower rectangular frame connected to the lower ends of said vertical legs, said vertical legs having grooved inner facing portions vertically disposed along the longitudinal axis of each leg, said end leg pairs having the grooved portions facing each other inwardly, said carriage having end portions coupled in and connected to said grooved portions and movable there within in a vertical direction.

5. An improved magnetic tape cartridge changer comprising:

a supporting frame;

power source;

first support means movably vertically coupled to said frame;

second support means movably connected to said first support means, said second support means horizontally movable relative to said first support means;

a tape cartridge storage rack connected to said frame, said storage rack having a plurality of receiving means for receiving cartridges aligned substantially vertically;

a transducer and tape drive means connected to and disposed on top of said second support means;

a selector switch means having a plurality of individual contact positions, each of said positions corresponding to a different tape cartridge rack storage position;

means connected to said first support means for resiliently holding said first support means in position relative to said cartridge storage rack for operable engagement of said transducer means with a cartridge disposed therein;

means connected to said first support means and said frame for moving said first support means from a first position in operable engagement against said resilient means to a second position vertically in which the transducer means is disengaged from the cartridge disposed within the cartridge rack;

means engageable with said second support means for moving said second support means horizontally whenever said first support means and transducer is in the disengaged position relative to said transducer and tape cartridge;

a plurality of stationary contacts connected to said first support means, each of said contacts aligned to correspond to a different cartridge position;

a movable contact engageable with each of said stationary contacts individually and connected to said second support means and movable therewith;

cut-off circuit means; and a circuit means connecting said power source, said selector switch individual positions, said stationary contacts said cut-off circuit means, said first support moving means, said second support moving means, and said movable contact means whereby movement of said selector from the first position to any adjacent position will provide power to said first support moving means and said cut-off circuit means to shut off power whenever said moving contact engages predetermined selected stationary contact corresponding to said preselected cartridge.

6. A cartridge changer, as in claim 5, wherein:

said second support means includes a planar surface having a slot therein, and said second support moving means includes an endless belt means having a protruding member engaged through said surface slot.

7. A cartridge changer, as in claim 6, wherein:

said second drive means includes:

a pair of sprockets rotatably coupled to said second support member, a sprocket drive means connected to one of said sprockets, said endless belt being a chain coupled about said sprockets.

8. A tape cartridge changer, as in claim 7, wherein said second support drive means includes:

a motor mounted to said supporting frame;

a drive wheel connected to said motor and engageable with said sprocket drive means whenever said first support means is positioned at its farthest location from said cartridge rack.

9. A tape cartridge changer, as in claim 6, wherein:

said stationary contact width is sized to compensate for the second support means momentum.

10. A tape cartridge, changer, as in claim 6, wherein said circuit means includes a trigger circuit comprising:

first capacitor means;

a first resistor connected across said first capacitor means;

second capacitor means;

second resistor connected across said second capacitor means;

said first capacitor means connected to alternate selector switch contact positions, said second capacitor means connected to different alternate selector switch contact positions whereby movement of the selector switch to an adjacent switch position triggers said circuit means.

* * * * *